Figure 1:
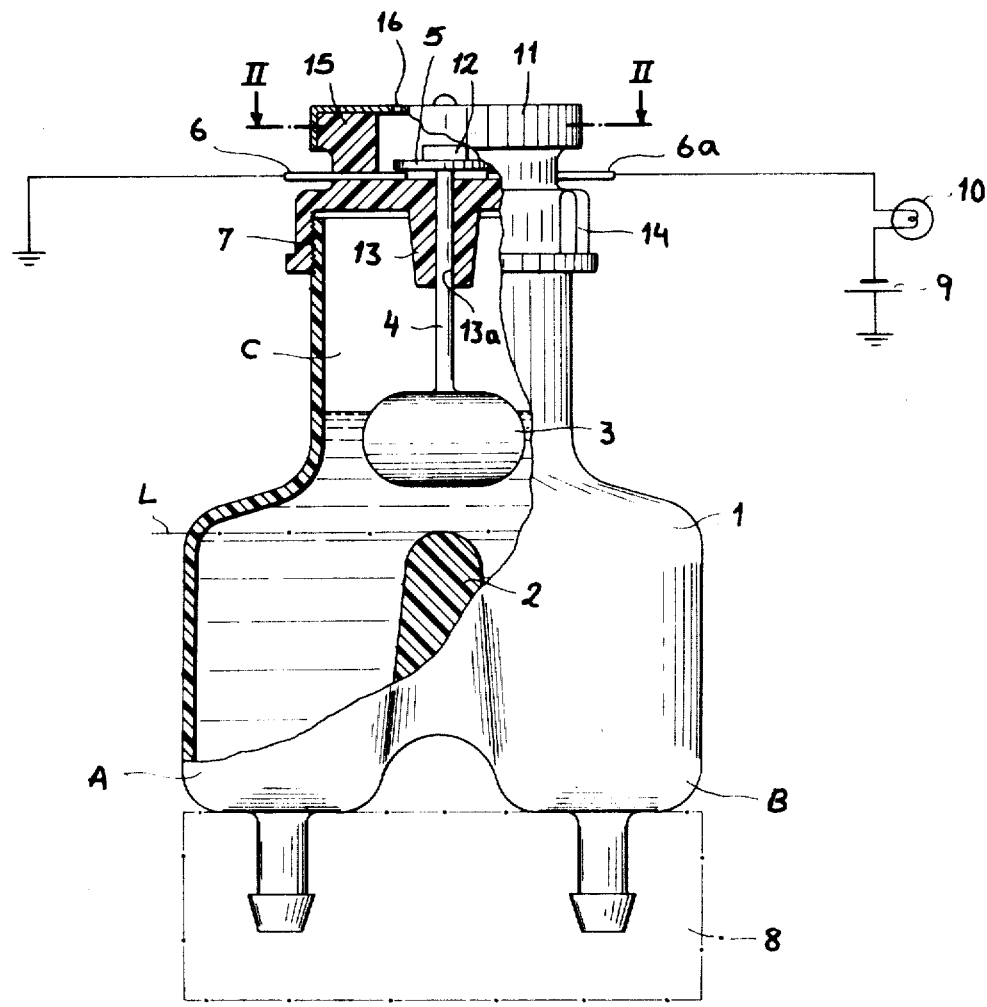

United States Patent

[11] 3,593,271

[72] Inventor Gert Schrader
 Walldorf Hesse, Germany
[21] Appl. No. 760,314
[22] Filed Sept. 17, 1968
[45] Patented July 13, 1971
[73] Assignee Alfred Teves, GmbH
 Frankfurt am Main, Germany
[32] Priority Sept. 20, 1967
[33] Germany
[31] T 34 831

[54] BRAKE-FLUID-LEVEL ALARM FOR A TWO-COMPARTMENT MASTER-CYLINDER RESERVOIR
6 Claims, 2 Drawing Figs.
[52] U.S. Cl. ................................................. 340/59, 200/84
[51] Int. Cl. ..................................................... B60t 17/22, G01f 23/10
[50] Field of Search ............................................ 340/59, 244; 73/308, 313; 200/84

[56] References Cited
UNITED STATES PATENTS
3,384,885  5/1968  Forbush ....................... 340/59

Primary Examiner—John W. Caldwell
Assistant Examiner—Howard S. Cohen
Attorney—Karl F. Ross ABSTRACT: A brake-fluid reservoir for a two-compartment master cylinder has an upper and a lower portion. The lower portion is divided by an upright partition wall. A float is movable in the upper portion to close a switch when the brake fluid in the reservoir drops below a predetermined lower limit. The upper portion is of restricted diameter in comparison to the lower portion and the float is only movable in the upper portion directly above the wall which terminates short of the top of the reservoir.

Gert Schrader
INVENTOR.

BY

Karl F. Ross
Attorney

BRAKE-FLUID-LEVEL ALARM FOR A TWO-COMPARTMENT MASTER-CYLINDER RESERVOIR

My invention relates to a brake-fluid reservoir for a two-compartment master cylinder, in particular, to such a reservoir combined with an alarm device for signaling a brake-fluid level in the reservoir.

One of the greatest problems in a dual brake system is providing a means for indicating a failure of one or both of the brake systems. Generally this problem is even further complicated by the desire to provide a single brake-fluid reservoir for such a dual brake system so that filling it does not also become a dual chore.

The solution to these problems has generally been to provide either a dual reservoir with dual float-actuated switches, as seen in the commonly assigned application Ser. No. 726,359 filed May 3, 1968 entitled "Brake-fluid reservoir" now U.S. Pat. No. a reservoir with no switch provision such as in the commonly assigned application Ser. No. 723,800 filed Apr. 24, 1968 entitled "Brake-fluid reservoir for a two-compartment master cylinder" now U.S. Pat. No.

It is an object of my invention to provide an inexpensive arrangement for signalling a significant drop on brake-fluid level in a reservoir for a two-compartment master cylinder.

A further object is to provide such a reservoir wherein the fluid supplies for the separate compartments of the master cylinder are sufficiently divided to ensure braking even if one compartment is totally drained.

These objects are obtained by providing a comparatively tall brake-fluid reservoir divided into an upper and a lower portion. The lower portion is in turn divided by an upstanding portion of limited height into two side-by-side chambers each communicating with a respective master-cylinder compartment. A float-actuated switch controls the alarm device. The float for this switch normally rides on the brake fluid in the upper portion and the switch mechanism with the float is all carried in the filler cap of the reservoir. The upper portion of this reservoir is quite narrow compared to the lower portion.

A device as described above presents the main feature of being very easy to manufacture and service. A single float serves to signal a drop in the fluid level in either chamber, thus making for a sizable saving over two-float installations.

Furthermore the reservoir can be topped off with brake fluid by simple removal of the single cap and pouring of the necessary amount of fluid into the reservoir.

Due to the narrowness of the upper portion or neck in which the float rides, sudden acceleration or stopping will have only a minor effect on the level therein, not tending to set off the alarm off falsely.

Also, in case of failure of one of the lines the fluid level will drop in the reservoir to the level of the top of the partition wall and will cease dropping in the chamber associated with the still functioning brake system. The amount of fluid held in one chamber (below the partition) more than suffices for continued operation of the brake system associated with it.

Figure 2:
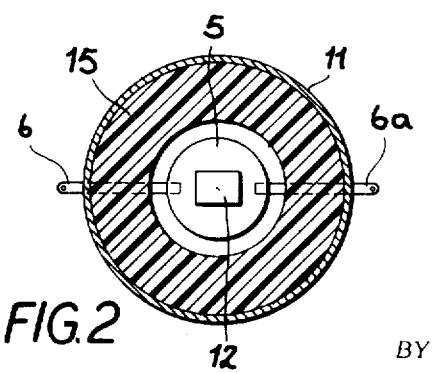

These and other features of my invention will be described in greater detail with reference to the accompanying drawing in which:

FIG. 1 shows a brake-fluid reservoir according to my invention, partly broken away, and FIG. 2 is a sectional view along line II-II of FIG. 1.

A reservoir has a housing 1 divided into two lower-portion chambers A and B separated by a wall 2, and an upper portion C which is considered to extend to the top of wall 2. The housing 1 is mounted on a two-compartment master cylinder 8 shown schematically by a dot-dash line.

The upper portion C is formed with a threaded neck 7 on which a cap 14 fits. The cap 14 is formed with a downward-extending projection 13 having an upright bore 13a and with an upward extending projection 15 on which a metal cap 11 with a vent 16 is form fitted.

A float 3 in the upper portion is mounted on a rod 4 carrying a conductive disc 5 held on the rod by a cap 12. This disc 5 can contact two contacts 6 and 6a thereby closing a circuit lighting a bulb 10 connected to a battery 9.

Under normal conditions the contacts 6 and 6a are not in contact with the disc 5 and the bulb 10 is therefore not lit. However, should the brake fluid drop to a level L they will come in contact thereby signaling an insufficient brake-fluid quantity in the reservoir to the driver.

In case of sudden acceleration or stopping the brake fluid will not be able to move to the side enough to cause the float 3 to drop thereby lighting the lamp 10.

To fill the reservoir, one need only remove the cap 14 thereby removing all the switch mechanism and pour brake fluid into the neck 7.

Under normal operating conditions the brake-fluid level is well up in the neck and the float 13 is therefore lifted to keep the contacts 6 and 6a out of contact with the disc 5. However, should one brake network become inoperative and all its fluid drain out, the fluid level will drop to line L and the circuit for the lamp 10 will operate signaling a dangerous brake condition to the driver. Meanwhile, enough brake fluid will remain in one of the chambers A or B to permit the remaining operative network to function and this fluid will be prevented from flowing into the neighboring chamber A or B by the partition 2.

1. A brake-fluid reservoir for a dual brake system having a dual master cylinder with two fluid compartments, and an alarm device for indicating a brake-fluid level in said reservoir, said reservoir comprising:
   a housing having an upper and a lower portion and formed with an upright partition wall dividing said lower portion into two chambers, each of said chambers communicating with a respective one of said master-cylinder compartments, and a neck extending upwardly above said wall; a cap threaded onto said neck for closing same; and
   switch means on said cap above said upright wall and in said neck responsive to said brake-fluid level therein and connectable to said alarm device for operating same.

2. The reservoir defined in claim 3 wherein said upper portion is narrow compared to said lower portion.

3. A brake-fluid reservoir fora dual brakesystem having a dual master cylinder with two fluid compartments, and an an alarm device for indicating a brake-fluid level in said reservoir, said reservoir comprising:
   a housing having an upper and a lower portion and formed with an upright partition wall dividing said lower portion into two chambers, each of said chambers communicating with a respective one of said master-cylinder compartments; and
   switch means above said upright wall and in said upper portion responsive to said brake-fluid level therein and connectable to said alarm device for operating same, said switch means comprising a float in said upper portion and contact means actuatable by said float for operating said alarm device.

4. The reservoir defined in claim 3 wherein said switch means further comprises a vertically movable upright rod, said float being mounted at one end of said pin, said contact means including a conductive member mounted at the other end of said pin, and at least one contact on said upper portion engageable by said conductive member on downward displacement of said float, thereby forming a closed path of conduction therewith for operating said alarm device.

5. The reservoir defined in claim 3 wherein, upon engagement of said contact with said conductive member, said float lies just above said partition, at a position of closest approach.

6. The reservoir defined in claim 3 wherein said upper portion is formed with an upwardly open mouth, said reservoir further comprising a filler-opening cap releasably closing said mouth, said switch means being mounted on said cap.